United States Patent
Szor

(10) Patent No.: US 7,325,251 B1
(45) Date of Patent: Jan. 29, 2008

(54) METHOD AND SYSTEM TO PREVENT PEER-TO-PEER (P2P) WORMS

(75) Inventor: Peter Szor, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 854 days.

(21) Appl. No.: 10/738,764

(22) Filed: Dec. 16, 2003

(51) Int. Cl.
*H04L 9/00* (2006.01)

(52) U.S. Cl. ............... 726/22; 726/23; 726/24; 726/25; 726/26; 713/165; 713/167; 713/188

(58) Field of Classification Search ............ None
See application file for complete search history.

(56) References Cited

U.S. PATENT DOCUMENTS

| | | | |
|---|---|---|---|
| 6,088,801 A * | 7/2000 | Grecsek | 726/1 |
| 7,032,000 B2 * | 4/2006 | Tripp | 709/202 |
| 7,188,367 B1 * | 3/2007 | Edwards et al. | 726/24 |
| 2003/0009565 A1 * | 1/2003 | Arao | 709/227 |

OTHER PUBLICATIONS

Baratloo, A., et al, 'Transparent Run-Time Defense Against Stack Smashing Attacks', 2000 Proceedings of the USENIX Annual Technical Conference, entire document, http://citeseer.ist.psu.edu/cache/papers/cs/24655/http:zSzzSzwww.research.avayalabs.comzSzprojectzSzlibsafezSzdoczSzusenix00.pdf/baratloo00transparent.pdf.*

Cornelli, F., et al, 'Choosing Reputable Servents in a P2P Network', WWW2002, May 7-11, 2002, Honolulu, Hawaii, ACM 1-58113-449-5/02/0005, entire document, http://www2002.org/CDROM/refereed/68/.*

Chien, Eric, "Malicious Threats of Peer-to-Peer Networking", Symantec, pp. 1-12 [online]. Retrieved on Apr. 2, 2004. Retrieved from the Internet:<URL:http://enterprisesecurity.Symantec.com/PDF/malicious_threats.pdf?EID=0>.

* cited by examiner

*Primary Examiner*—Nasser Moazzami
*Assistant Examiner*—Ronald Baum
(74) *Attorney, Agent, or Firm*—Gunnison, McKay & Hodgson, L.L.P.; Lisa A. Norris

(57) ABSTRACT

A call to a file system function is intercepted in the context of a caller, and stalled. A determination is made whether malicious code, such as a peer-to peer (P2P) computer worm, is detected based upon the call. Upon a determination that malicious code is detected, protective action is taken, such as terminating the call to the file system function, and, optionally, a notification generated. Alternatively, upon a determination that malicious code is not detected, the call to the file system function is released.

30 Claims, 6 Drawing Sheets

METHOD AND SYSTEM TO PREVENT PEER-TO-PEER (P2P) WORMS

BACKGROUND OF THE INVENTION

1. Field of the Invention

The present invention relates to the protection of computer systems. More particularly, the present invention relates to a method and system for detecting and preventing malicious code attacks on computer systems, such as by computer worms.

2. Description of the Related Art

Peer-to-peer (P2P) networks, and in particular, P2P file sharing networks are becoming increasingly popular avenues for exchange of computer files, such as music files and software applications. Generally, each of the computer systems on a P2P network is viewed as a peer computer system, and is able to both access shared resources on other computer systems on the network and share their own resources with other computer systems on the network.

Within a P2P file sharing network, computer systems on the network make selected files available to share with the other computer systems on the P2P network, for example, by placing selected files in a P2P shared file folder. In particular, file sharing applications on P2P networks permit users of one computer system to initiate a query for information found in files in a P2P shared file folder of another computer system on the P2P network, and to download the file from the other computer system if so desired.

Unfortunately, the download of a file also provides an avenue for the introduction of malicious code, such as a computer worm, as part of the downloaded file. Further, once downloaded to another computer system, the malicious code can again be further propagated to the other computer systems on the P2P network through the use of the P2P shared file folder.

SUMMARY OF THE INVENTION

In accordance with the invention, a call to a file system function is intercepted in the context of a caller, and stalled. A determination is made whether malicious code, such as a P2P computer worm, is detected based upon the call. Upon a determination that malicious code is detected, protective action is taken, such as terminating the call to the file system function, and, optionally, a notification generated. Alternatively, upon a determination that malicious code is not detected, the call to the file system function is released. In one embodiment, the call that is intercepted is a call to a file system function that copies or closes a file.

In one embodiment, a call to a file system function that copies a file from a source to a destination is intercepted in the context of a caller and stalled. The caller, the source, and the destination of the call are determined. A determination is made whether the destination is in a shared file folder, such as a P2P shared file folder. Upon a determination that the destination is in a shared file folder, a determination is made whether the caller and the source are the same. Upon a determination that the caller and the source are the same, i.e., the caller is copying itself to a destination in a shared file folder, a determination is made whether the caller is excluded, for example, whether it is acceptable that the caller copy itself to the shared file folder. Upon a determination that the caller is not excluded, the call is determined to indicate malicious code and protective action is taken, such as terminating the call. Optionally, a notification is generated notifying of the detection of malicious code, as well as any protective action taken.

Alternatively, a call to a file system function that copies a file from a source to a destination that is not in a shared file folder, in which the caller and the source are not the same, or in which the caller is excluded, is released.

In another embodiment, a call to a file system function that closes a file at a destination is intercepted in the context of a caller and stalled. The caller and the destination are determined. A determination is made whether the destination is in a shared file folder, such as a P2P shared file folder. Upon a determination that the destination is in a shared file folder, a determination is made whether at least a portion of the contents of the caller, such as a program code section of the caller, and at least a portion of the contents at the destination, such as a program code section at the destination, are equivalent. Upon a determination that the at least a portion of the contents of the caller and the at least a portion of the contents at the destination are equivalent, i.e., a caller is replicating at least a portion of itself to a shared file folder, a determination is made whether the caller is excluded, for example, whether it is acceptable that the caller replicate at least a portion of itself to a shared file folder. Upon a determination that the caller is not excluded, the call is determined to indicate malicious code and protective action is taken, such as terminating the call. Optionally, a notification is generated notifying of the detection of malicious code, as well as any protective action taken.

Alternatively, a call to a file system function that closes a file at a destination not in a shared file folder, in which the at least a portion of the contents of the caller and the at least a portion of the contents at the destination are not equivalent, or in which the caller is excluded, is released.

Detecting the replication of malicious code programs, such as P2P computer worms, to a shared access destination, such as in a P2P shared file folder, before execution of the called file system function, permits propagation of a malicious code file from the shared access destination to be prevented.

Embodiments in accordance with the invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Typically, P2P computer worms do not need to enumerate network shares or resources. Rather, some P2P computer worms simply copy themselves to known default P2P shared directories, also termed shared file folders, as files, for example:

%ProgramFiles%\Kazaa\My Shared Folder\FlashMXplayer.exe;

%ProgramFiles%\KaZaA Lite\My Shared Folder\XiaoXiao.exe;

%ProgramFiles%\BearShare\Shared\setup.exe;

%ProgramFiles%\Edonkey2000\Incoming\RA2_Update.exe;

%ProgramFiles%\limewire\Shared\FixRUNDLL bugs.exe;

%ProgramFiles%\KMD\My Shared Folder\AXM_WORM.exe;

%ProgramFiles%\Morpheus\My Shared Folder\Bugbear_Removal.exe; and

%ProgramFiles%\Grokster\SEXisFUN.exe.

Other P2P computer worms prepend themselves to existing files in such directories or overwrite existing files with themselves. When the P2P computer worm executable file is downloaded, it is placed into a download file folder on a local disk. When executed, it will eventually copy itself back to a P2P shared file folder. Such file folders are often discovered with hard coded path names or via registry settings. Additionally, some P2P computer worms change their file name and/or a portion of their file contents making it more difficult to discern whether a computer worm file is making a copy of itself.

Figure 2:
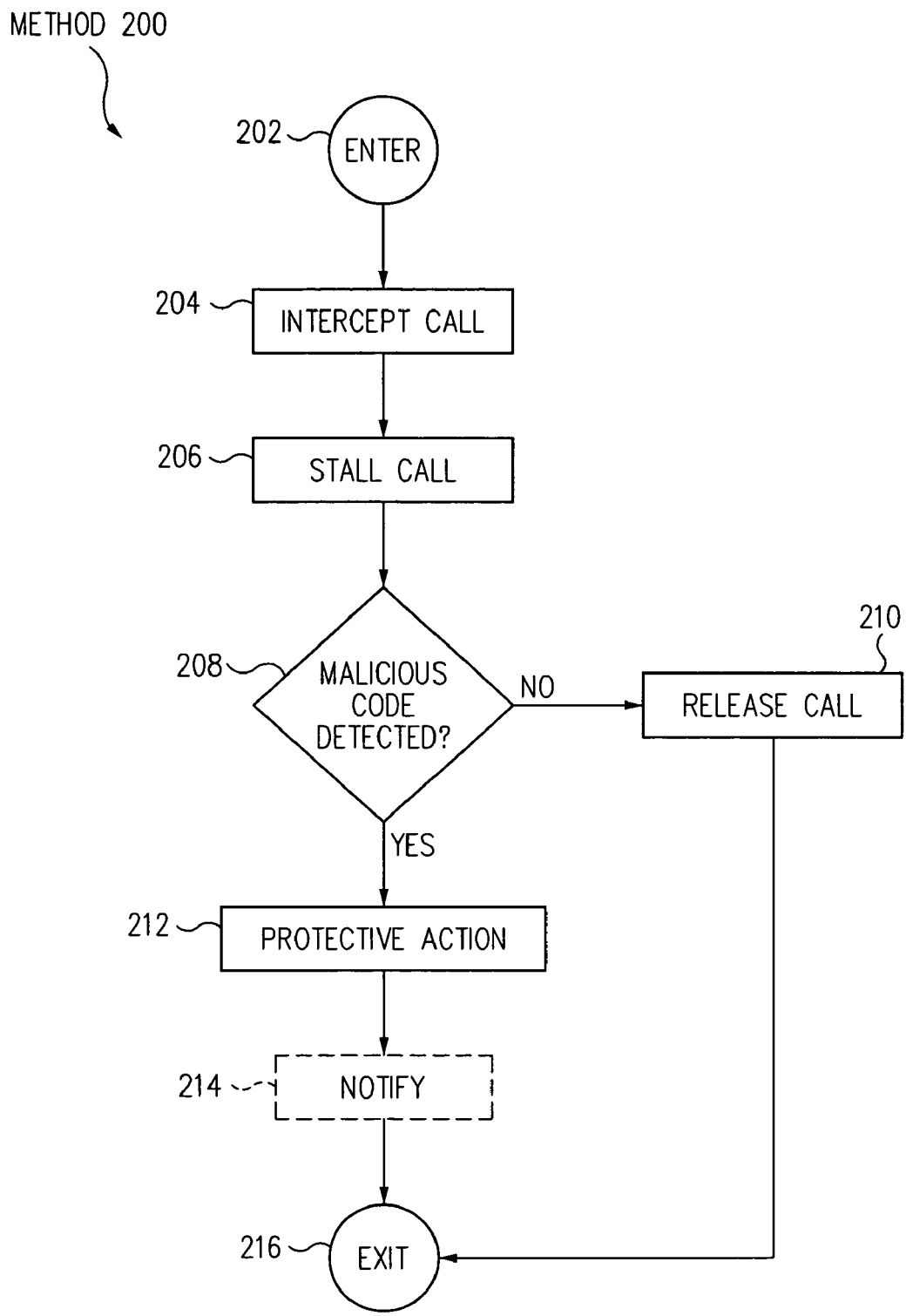
FIG. 2 illustrates a process flow diagram of a method used by the detection application of FIG. 1 for detecting malicious code in accordance with one embodiment of the invention.
Figure 5:
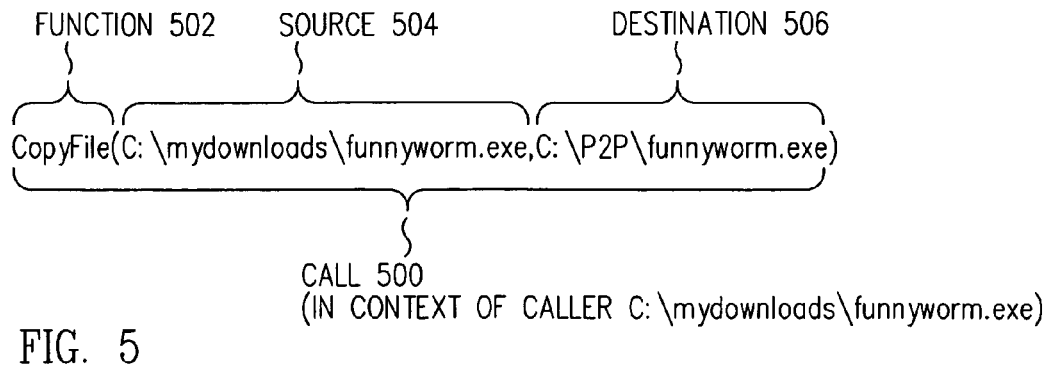
FIG. 5 illustrates an example of a call to a copy file function.
Figure 6:
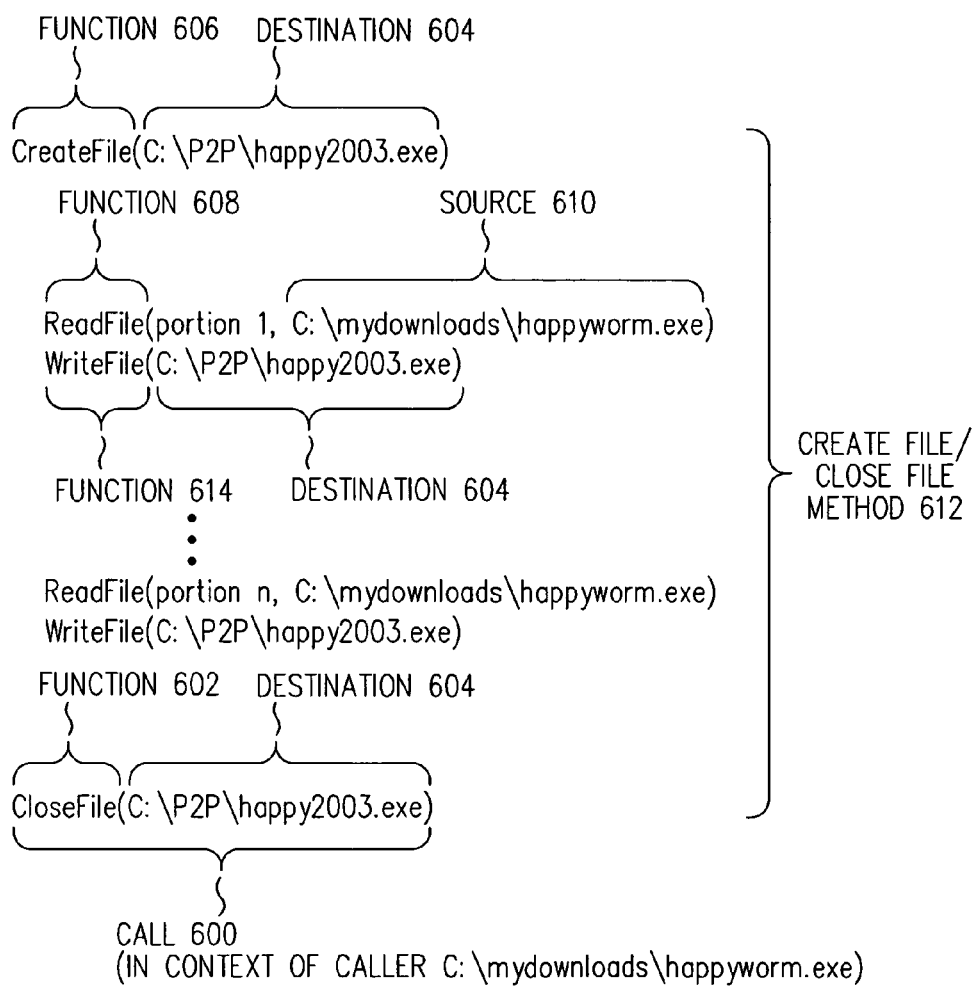
FIG. 6 illustrates an example of a call to a close file function.

Accordingly, referring to FIGS. 2, 5, and 6, in one embodiment, a call to a file system function is intercepted in the context of a caller (operation 204). In one embodiment, a call to a file system function that copies a file or closes a file, such as a call 500 or a call 600, are intercepted. The call to the file system function is stalled (operation 206) and a determination is made whether malicious code is detected based on the call (operation 208). Upon a determination that malicious code is detected, protective action is taken (operation 212), such as terminating the call to the file system function, otherwise, the call is released (operation 210). Optionally, a notification is generated (operation 214), such as a notification to a user that a malicious code is detected, as well as any protective action taken.

Herein, malicious code is defined as any computer program, module, set of modules, or code that enters a computer system without an authorized user's knowledge and/or without an authorized user's consent. Further herein, malicious code activity is defined as any activity that is indicative of malicious code.

Herein embodiments in accordance with the invention are described with reference to a host computer system which is networked to other computer systems on a P2P network, and thus is susceptible to attack by malicious code, such as P2P computer worms, and can be used to propagate malicious code from a file folder accessible by other computer systems on the P2P network, such as a P2P shared file folder. It can be understood by those of skill in the art that the exemplary embodiments described herein are illustrative only and are not intended to limit the scope of the application.

Figure 1:
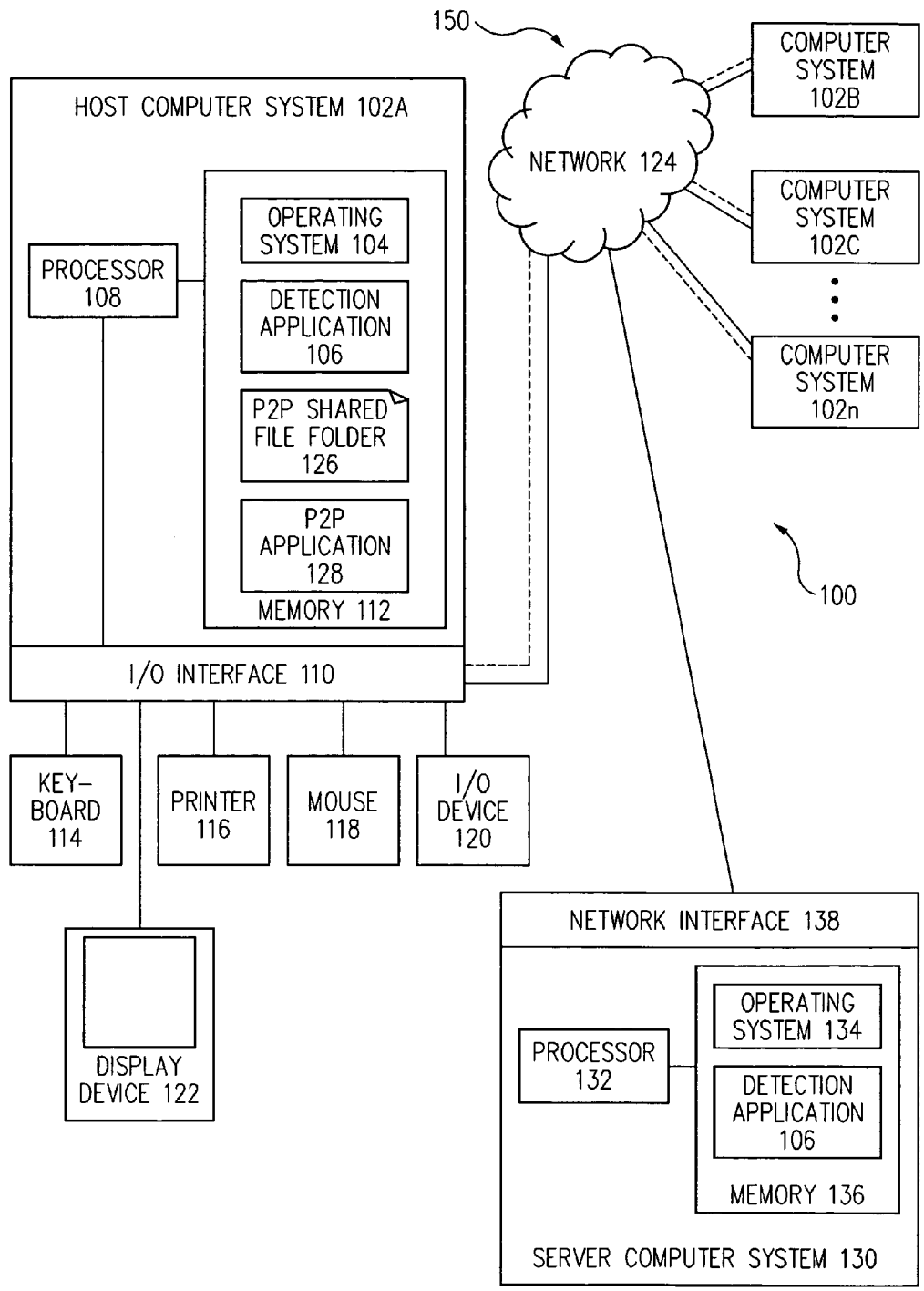
FIG. 1 illustrates a diagram of a detection application executing on a host computer system in accordance with one embodiment of the invention.

FIG. 1 illustrates a diagram of a detection application 106 executing on host computer system 102A in accordance with one embodiment of the invention. Host computer system 102A can be a stand-alone computer system, such as a personal computer or workstation. In one embodiment, host computer system 102A is configured as part of a peer-to-peer (P2P) network 150 (indicated by dotted lines), such as eDonkey, Gnutella, Grokster, KaZaa, and Morpheus, in which host computer system 102A interacts with other computer systems on P2P network 150, such as with the computer systems 102B-102n. Host computer system 102A can also be configured as part of client-server system 100 also illustrated in FIG. 1 in which host computer system 102A interacts with a server computer system 130 via a network 124, such as the Internet.

In one embodiment, host computer system 102A further includes a P2P application 128 for establishing and maintaining communications on P2P network 150, as well as a P2P shared file folder 126. In the present embodiment, P2P shared file folder 126 is a shared file folder that provides selected resources, such as files, for access by other computer systems on P2P network 150, for example, by computer systems 102B-102n.

Detection application 106 is described herein as executing on host computer system 102A. However, in light of this disclosure, those of skill in the art will understand that the description is applicable to P2P network 150 and computer systems 102B-102n, interacting simultaneously or serially.

Host computer system 102A typically further includes a processor 108, an input/output (I/O) interface 110, an operating system 104, and a memory 112. In one embodiment, memory 112 includes a main memory, as well as any supplemental memories, and includes executable areas, data storage areas, and any memory areas needed by host computer system 102A (including operating system 104).

Host computer system 102A may additionally include: standard input devices, such as a keyboard 114 and a mouse 118; standard output devices, such as a printer 116 and a display device 122; as well as one or more standard input/output (I/O) devices 120, such as a compact disk (CD) or DVD drive, floppy disk drive, or other digital or waveform port for inputting data to and/or outputting data from host computer system 102A.

In one embodiment, detection application 106 is loaded into memory 112 of host computer system 102A via I/O device 120, such as from a CD or floppy disk containing detection application 106. In other embodiments, detection application 106 can be part of another application, such as an anti-viral (AV) application (not shown) that is loaded into memory 112 of host computer system 102A. In some embodiments, detection application 106 can be stored on server computer system 130 and downloaded to host computer system 102A via network 124, separately or as part of another application.

As illustrated, server computer system 130 of client-server system 100 is coupled to host computer system 102A by network 124. Network 124 can be any network or network system that is of interest to a user.

Server computer system 130 typically includes: a network interface 138 for communicating with network 124; a processor 132; an operating system 134; and, a memory 136. As earlier described, in some embodiments, detection application 106 is stored in memory 136 for downloading to host computer system 102A. Server computer system 130 can further include a display, a keyboard, a mouse, and other input/output (I/O) devices, not shown.

The particular type of and configuration of host computer system 102A, computer systems 102B-102n, and server computer system 130 are not essential to embodiments of the invention. In various embodiments, network interface 138 and I/O interface 110 include analog modems, digital modems, or a network interface card.

FIG. 2 illustrates a process flow diagram of a method 200 used by detection application 106 for detecting malicious code in accordance with one embodiment of the invention. Herein, for purposes of description, embodiments of the invention are described with reference to calls to file system functions utilized on a Windows®-based operating system, such as CopyFile( ) and CloseFile( ). However, these descriptions are not intended to be limiting, and the invention can be utilized with other operating systems that use calls to file system functions which accomplish the same or similar functions. Referring now to FIGS. 1, 2, 5 and 6 together, in one embodiment, execution of detection application 106 by processor 108 results in the operations of host computer method 200 as described below.

From an ENTER operation 202, processing transitions to an INTERCEPT CALL operation 204.

In INTERCEPT CALL operation 204, a call to a file system function that copies or closes a file is intercepted by detection application 106 in the context of a calling application (or other executable process), also termed herein the caller, prior to execution of the call. In one embodiment, an intercept mechanism or module located in detection application 106, such as a file system filter driver or a hooking mechanism, intercepts a call to a copy file function, for example, CopyFile( ), or to a close file function, for example, CloseFile( ), as further described herein with reference to FIGS. 5 and 6.

FIG. 5 illustrates an example of a call 500 to a copy file function 502. In FIG. 5, call 500 includes function 502, e.g., "CopyFile( )", a source 504, e.g., "C:\mydownloads\funnyworm.exe", and a destination 506, e.g., "C:\P2P\funnyworm.exe". For purposes of illustration, the present example of call 500 is in the generalized form of CopyFile(source,destination) where call 500 copies the file (and all its contents) at source 504 to destination 506. In the present example, source 504 and destination 506 are the file paths representative of the files at source 504 and destination 506, respectively. The caller, "C:\mydownloads\funnyworm.exe", initiates call 500 to copy itself, as source 504, to destination 506, "C:\P2P\funnyworm.exe", with the same file name of "funnyworm.exe".

If the caller, "C:\mydownloads\funnyworm.exe", is a malicious code file and "P2P" is a shared file folder, such as P2P shared file folder 126, the caller is utilizing call 500 to create another malicious code file (which is a copy of itself) in a shared file folder. Once copied to the shared file folder, the copied file is available for further propagation to other users on P2P network 150, for example, by downloading from the shared file folder.

Rather than using a call to a copy file function, a malicious code file can create another malicious code file from itself using other methods, such as a create file/close file method as further described with reference to FIG. 6. A create file/close file method permits incremental reading of code from a calling malicious code file (as source) and writing of the code to a destination. Thus, a malicious code file or portions of a malicious code file can be incrementally read and then written to a destination to produce another malicious code file. In some instances, variations can be introduced to create another malicious code file that, while not an exact copy of the initiating malicious code file, contains the code necessary for further propagation of a malicious code.

FIG. 6 illustrates an example of a call 600 to a close file function 602. For purposes of illustration, close file function 602 is presented within a create file/close file method 612 having the general form of:
CreateFile(destination)
   ReadFile(source)
   WriteFile(destination)
   .
   .
   .
   ReadFile(source)
   WriteFile(destination)
CloseFile(destination).

In FIG. 6, call 600 includes function 602, e.g., "CloseFile( )", and a destination 604, e.g., "C:\P2P\happy2003.exe". In the present example, call 600 is in the generalized form of CloseFile(destination) where call 600 closes the file created at destination 604. In the present example, destination 604 is the file path representative of the file at destination 604.

In create file/close file method 612, a call to a function 606, "CreateFile( )", initiates the creation of the file at destination 604, e.g., "C:\P2P\happy2003.exe". Portions of source 610, e.g., "C:\mydownloads\happyworm.exe", are read using calls to function 608, "ReadFile( )", and written to destination 604, "C:\P2P\happy2003.exe", using calls to function 614, "WriteFile( )". The caller, "C:\mydownloads\happyworm.exe", initiates call 600 to close the file at destination 604 to which it has incrementally replicated some or all of its contents.

If the caller, "C:\mydownloads\happyworm.exe", is a malicious code file and "P2P" is a shared file folder, such as P2P shared file folder 126, the caller is utilizing call 600 to create another file containing malicious code (portions of itself) in a shared file folder with a different file name, "happy2003.exe". Further, the caller, "C:\mydownloads\happyworm.exe", can also utilize create file/close file method 612 to introduce differences into the file "happy2003.exe" at destination 604 so as to differentiate the file "happy2003.exe" from the file "happyworm.exe" at source 610.

Referring again to FIG. 2, in other embodiments, INTERCEPT CALL operation 204 is performed by an intercept mechanism located outside of detection application 106. For example, a hooking mechanism located outside of detection application 106 and run in kernel mode rather than user mode can intercept the call in the context of the caller. In some embodiments, the intercept mechanism is included as part of another application in communication with detection application 106, such as an anti-viral (AV) application.

In method 200, upon intercepting the call, e.g., call 500 or call 600, INTERCEPT CALL operation 204 transitions processing to a STALL CALL operation 206.

In STALL CALL operation 206, the call, e.g., call 500 or call 600, is stalled. In one embodiment, detection application 106 stalls the call, for example, by storing or buffering the call in the intercept module or in another memory structure. In embodiments in which the call is intercepted by an intercept mechanism located outside of detection application 106, the call can be stored or buffered outside of detection application 106. Upon stalling the call, STALL CALL operation 206 transitions processing to a MALICIOUS CODE DETECTED check operation 208.

In MALICIOUS CODE DETECTED check operation 208, detection application 106 determines whether the intercepted call is indicative of malicious code, for example, whether a P2P computer worm is detected. The determination of whether the intercepted call is indicative of malicious code, i.e., malicious code is detected, is further described herein with reference to FIGS. 3 and 4.

Upon a determination that malicious code is detected, processing transitions from MALICIOUS CODE DETECTED check operation 208 to a PROTECTIVE ACTION operation 212.

In PROTECTIVE ACTION operation 212, protective action is taken to prevent the execution of the stalled call. For example, in one embodiment, the stalled call is terminated. More particularly, the call is not passed to the operating system but is terminated. Termination of calls to a function is well known to those of skill in the art and so is not further described herein for clarity of description. Thus, the malicious code file is not copied or closed at the destination on host computer system 102A, e.g., in P2P shared file folder 126, preventing possible further propagation of the malicious code.

In another example of a protective action, the caller, e.g., a calling malicious code, such as a P2P computer worm, is removed from host computer system 102A or quarantined for further action. Upon implementation of the protective action, PROTECTIVE ACTION operation 212 transitions processing to an optional NOTIFY operation 214 (or directly to EXIT operation 216 if NOTIFY operation 214 is not performed).

In optional NOTIFY operation 214, in one embodiment, the user of host computer system 102A is notified that protective action has been taken on host computer system 102A, for example, that a copy file or a close file operation has been terminated. In some embodiments, other users are also notified, such as a system administrator. The user and/or administrator can be notified using any one of a number of techniques, e.g., by using a pop up window, by writing to a file and/or otherwise by logging the event. In some embodiments, a notification is provided to a security center. Upon optional notification, NOTIFY operation 214 transitions processing to an EXIT operation 216.

In EXIT operation 216, processing exits method 200, or, optionally, waits for the next call to a file system function, such as a call to a copy file or a close file function, and returns to operation 204.

Referring again to MALICIOUS CODE DETECTED check operation 208, upon a determination that malicious code is not detected, processing transitions from MALICIOUS CODE DETECTED check operation 208 to an RELEASE CALL operation 210.

In RELEASE CALL operation 210, in one embodiment, the stalled call, e.g., call 500 or call 600, is released. For example, in one embodiment, in which detection application 106 intercepts and stalls a call to a file system function, the call to the file system function is released from detection application 106. Upon release of the call, the called file system function is performed, e.g., a file is copied or closed. From RELEASE CALL operation 210, processing transitions to EXIT operation 216 earlier described.

Figure 3:
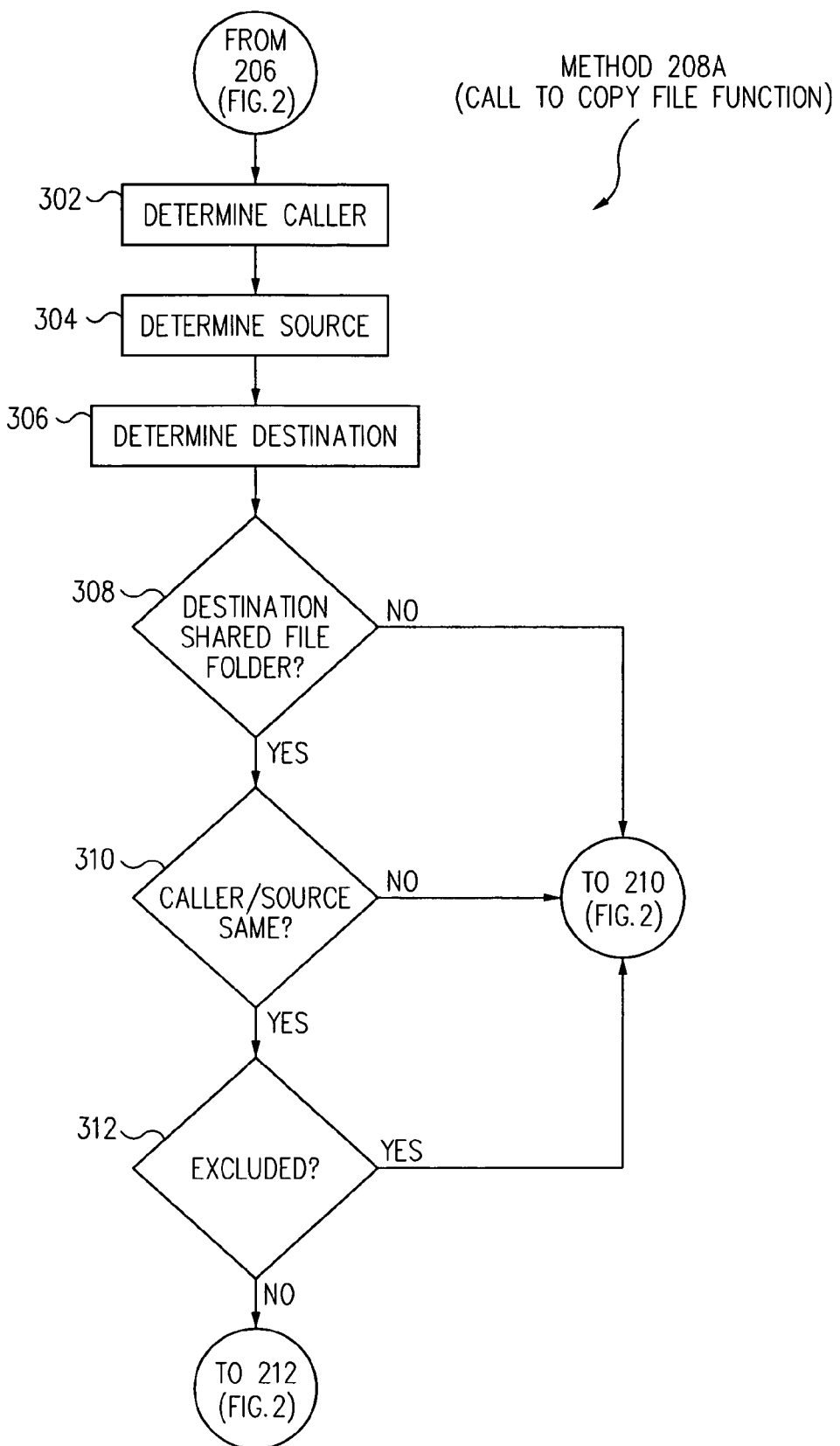
FIG. 3 illustrates a process flow diagram of a method used in a MALICIOUS CODE DETECTED check operation of FIG. 2 when a call to a copy file function is intercepted and stalled in accordance with one embodiment of the invention.
Figure 4:
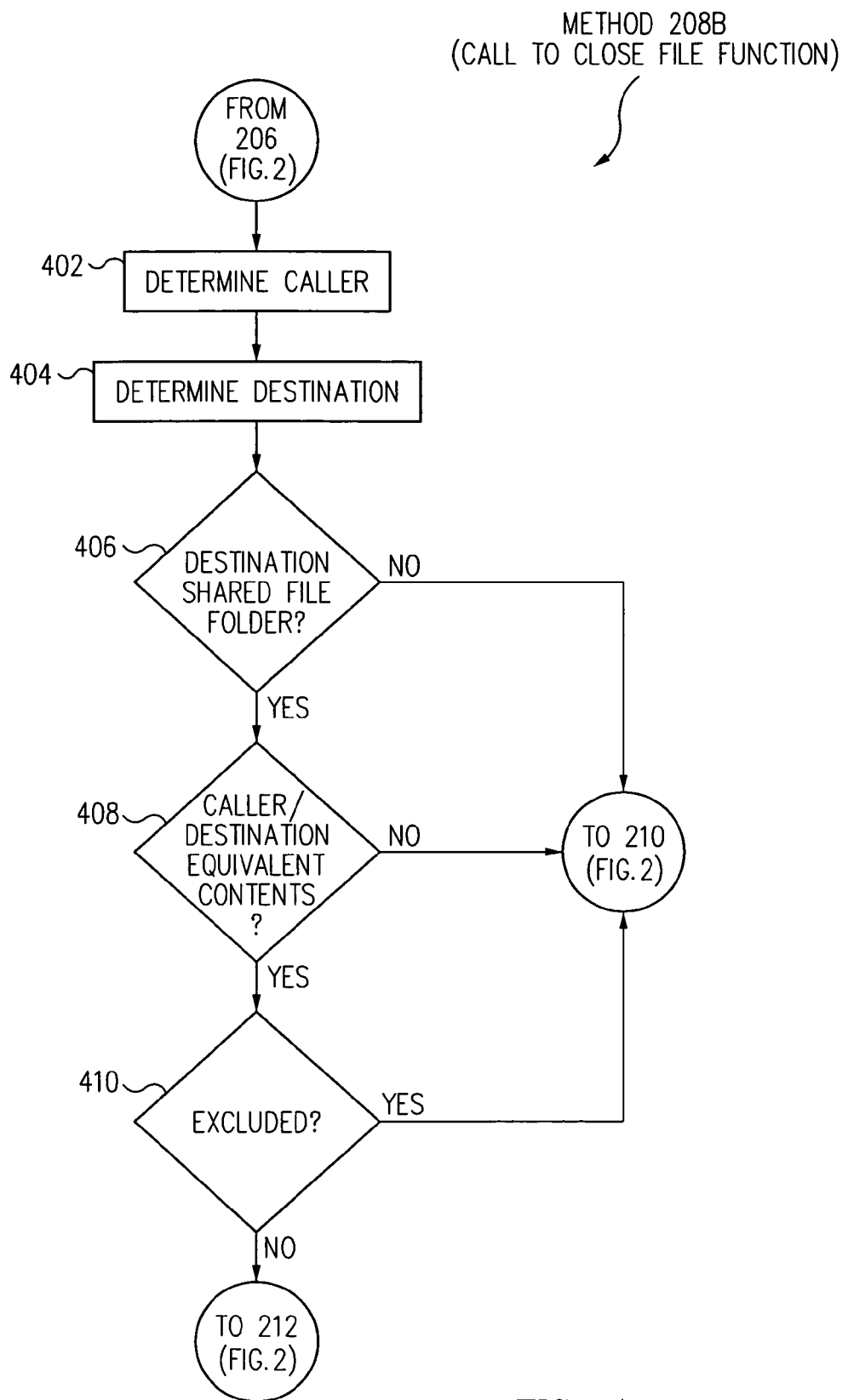
FIG. 4 illustrates a process flow diagram of a method used in a MALICIOUS CODE DETECTED check operation of FIG. 2 when a call to a close file function is intercepted and stalled in accordance with one embodiment of the invention.

FIGS. 3 and 4 illustrate examples of methods used in MALICIOUS CODE DETECTED check operation 208 of method 200. FIG. 3 illustrates an example in which the intercepted call is a call to a file system function that copies a file and FIG. 4 illustrates an example in which the intercepted call is a call to a file system function that closes a file.

FIG. 3 illustrates a process flow diagram of a method 208A used in MALICIOUS CODE DETECTED check operation 208 of FIG. 2 when a call to a copy file function is intercepted and stalled in accordance with one embodiment of the invention. Referring to FIGS. 2, 3, and 5 together, in one embodiment, in INTERCEPT CALL operation 204, a call to a copy file function, such as call 500, is intercepted in the context of a caller, e.g., caller "C:\mydownloads\funnyworm.exe", and stalled in STALL CALL operation 206. STALL CALL operation 206 transitions processing to MALICIOUS CODE DETECTED check operation 208, and, particularly to method 208A and a DETERMINE CALLER operation 302.

In DETERMINE CALLER operation 302, the application (or other executable process) that initiates the copy file function, i.e., the caller, is determined. In one embodiment, the complete file name of the caller is determined. Herein a complete file name includes the file path with the file name.

In one embodiment, the complete file name of the caller is obtained using the Process Identifier (PID) of the caller. A PID is a value used to identify a process, and is typically valid from the time a process is created until it is terminated. The PID is associated with a module or process name that includes the complete file name of the process which, in the present embodiment, is the complete file name of the caller. PIDs and the association of a PID to a process is well known to those of skill in the art and not further described herein for clarity.

For example, assume a hooking program (run in either user mode or kernel mode) is utilized by detection application 106 as the interception mechanism on a Windows®-based operating system. When call 500 is made, call 500 is intercepted by the hooking program instead of being sent to the original function, e.g., CopyFile( ). In a Windows®-based operating system, the PID of the caller of call 500 is obtained using any of a variety of well-known functions, for example GetCurrentProcessID( ). The PID is obtained and the module or process name of the caller is obtained using the PID. Detection application 106 obtains the complete file name of the caller from the module or process name, for example, "C:\mydownloads\funnyworm.exe". Determination of contexts, PIDs, module or process names, and callers are well known to those of skill in the art and so are not further described herein for clarity. Upon determination of the caller, DETERMINE CALLER operation 302 transitions processing to a DETERMINE SOURCE operation 304.

In DETERMINE SOURCE operation 304, the source of the file to be copied to destination 506 is determined. In one embodiment, the complete file name of source 504 is determined from call 500. For example, in call 500, "C:\mydownloads\funnyworm.exe" is the complete file name of source 504. Upon determination of the source, DETERMINE SOURCE operation 304 transitions processing to a DETERMINE DESTINATION operation 306.

In DETERMINE DESTINATION operation 306, the destination of the file to be copied from source 504 is determined. In one embodiment, the complete file name of destination 506 is determined from call 500. For example, in call 500, "C:\P2P\funnyworm.exe" is the complete file name of destination 506. Upon determination of the destination, DETERMINE DESTINATION operation 306 transitions processing to a DESTINATION SHARED FILE FOLDER check operation 308.

In DESTINATION SHARED FILE FOLDER check operation 308, a determination is made whether the destination is in a shared file folder, such as a P2P shared file folder accessible by other computer systems on the P2P network. In one embodiment, this determination is made by examining the complete file name of destination 506, e.g., "C:\P2P\funnyworm.exe", for the presence of a shared file folder name, such as "P2P", "My P2P Folder", "My Shared Folder", or "Shared", among others.

In one embodiment, the complete file name of destination 506 is scanned or parsed for file folder names matching shared file folder name entries, such as P2P shared file folder name entries, in a shared file folder name list. When a file folder name matches a shared file folder name entry in the shared file folder name list, destination 506 is determined to be in a shared file folder, e.g., in a P2P shared file folder, such as P2P shared file folder 126. Otherwise, when a file folder name does not match a shared file folder name entry in the shared file folder name list, destination 506 is not determined to be in a shared file folder.

In one embodiment, the shared file folder name list includes file folder names determined to be shared file folders, such as the name of a P2P shared file folder, for example "P2P". In one embodiment, the shared file folder name list is located in detection application 106, while in other embodiments, the shared file folder name list is located elsewhere, such as in an anti-viral application (not shown), and accessible by detection application 106. In one embodiment, the shared file folder name list is extendible by the user, i.e., the user can add additional shared file folder name entries to the shared file folder name list.

Upon a determination that the destination is not in a shared file folder ("NO"), the call is not determined to indicate malicious code and processing exits method 208A and transitions from DESTINATION SHARED FILE FOLDER check operation 308 to RELEASE CALL operation 210 of method 200.

Alternatively, a determination that the destination is in a shared file folder name indicates that a file is being copied to a destination in a shared file folder, such as P2P shared file folder 126, and that the call is to be further evaluated. Thus, upon a determination that the destination is in a shared file folder ("YES"), DESTINATION SHARED FILE FOLDER check operation 308 transitions processing to a CALLER/SOURCE SAME check operation 310.

In CALLER/SOURCE SAME check operation 310, a determination is made whether the caller is the same as the source. While this action may occur as the result of actions by non-malicious code (later discussed with regard to exclusions), it is viewed as an unusual occurrence. More typically, a caller would be different from a source, and thus the call would not be considered malicious.

In the present embodiment, the caller and source 504 are determined to be the same when the complete file name of the caller (obtained in operation 302) matches the complete file name of source 504 (obtained in operation 304). Herein a complete file name includes the file path with the file name. For example, in call 500, the complete file name of the caller, "C:\mydownloads\funnyworm.exe", and the complete file name of source 504, "C:\mydownloads\funnyworm.exe", are compared to determine if the complete file name of the caller and the complete file name of source 504 are the same, e.g., match. In the present example, there is a match, and thus the callers "C:\mydownloads\funnyworm.exe", and source 504 are determined to be the same.

Upon a determination that the caller and the source are the same ("YES"), the call is tentatively, and more strongly, indicative of malicious code, barring its exclusion, as a caller is copying itself to a destination in a shared file folder. Thus, to provide a check to a possible false positive determination of a call as indicative of malicious code, CALLER/SOURCE SAME check operation 310 transitions processing to an EXCLUDED check operation 312.

Alternatively, when there is not a match, the caller and source 504 are not determined to be the same ("NO"), the call is not determined to indicate malicious code, and processing exits method 208A and transitions from CALLER/SOURCE SAME check operation 310 to RELEASE CALL operation 210 of method 200.

In EXCLUDED check operation 312, a determination is made whether the caller is excluded from a determination of a malicious code detection. In one embodiment, the complete file name of the caller, e.g., "C:\mydownloads\funnyworm.exe", is compared to excluded caller entries in an exclusion list. In one embodiment, an excluded caller entry is the complete file name of an application or other executable process to be excluded from a determination of a call as indicative of malicious code. When the complete file name of a caller matches an excluded caller entry on the exclusion list, the call is excluded from a determination of a malicious code detection. Otherwise, when there is not a match, the caller is not excluded from a determination of a malicious code detection.

In other embodiments, an excluded caller entry is a portion of the complete file name of an application or other executable process to be excluded from a determination of a call as indicative of malicious code, such as a file name. In this alternative embodiment, a portion of the complete file name of the caller, such as the file name, is compared to excluded caller entries in the exclusion list.

In one embodiment, the exclusion list is located in detection application 106, while in other embodiments, the exclusion list is located elsewhere, such as in an anti-viral application (not shown), and accessible by detection application 106. In one embodiment, the exclusion list is extendible by the user, e.g., the user can add additional excluded caller entries to the exclusion list.

In call 500, when the complete file name of the caller, "C:\mydownloads\funnyworm.exe", matches an excluded caller entry, the caller is excluded from a determination of a malicious code detection. Otherwise, the caller would not be excluded from a determination of a malicious code detection.

Upon a determination that the caller matches an excluded caller entry on the exclusion list ("YES"), the caller is excluded from a determination of a malicious code detection. Thus, the call is defined as not indicative of malicious code, e.g., malicious code is not detected ("NO"), and processing exits method 208A and transitions from EXCLUDED check operation 312 to RELEASE CALL operation 210 of method 200.

Alternatively, upon a determination that the caller does not match an excluded caller entry on the exclusion list ("NO"), the caller is not excluded from a determination of a malicious code detection. Thus, the call is determined to be indicative of malicious code, e.g., malicious code is detected ("YES"), and processing exits method 208A and transitions from EXCLUDED check operation 312 to PROTECTIVE ACTION operation 212.

Thus, in method 208A, in one embodiment, a caller of a copy file function which copies itself (as source) to a shared file folder, and is not excluded, is determined to indicate malicious code, e.g., malicious code is detected.

As earlier described, rather than using a call to a copy file function, some malicious code may instead use a different method, such as a create file/close file method, to copy at least a portion of itself to a shared file folder to permit further propagation of malicious code from the shared file folder.

FIG. 4 illustrates a process flow diagram of a method 208B used in MALICIOUS CODE DETECTED check operation 208 of FIG. 2 when a call to a close file function is intercepted and stalled in accordance with one embodiment of the invention. Referring to FIGS. 2, 4, and 6 together, in one embodiment, in INTERCEPT CALL operation 204, a call to a close file function, such as call 600, is intercepted in the context of a caller, e.g., caller "C:\mydownloads\happyworm.exe", and stalled in STALL CALL operation 206. STALL CALL operation 206 transitions processing to MALICIOUS CODE DETECTED check operation 208, and, particularly to method 208B and a DETERMINE CALLER operation 402.

In DETERMINE CALLER operation 402, the application (or other executable process) that initiates the close file function, i.e., the caller, is determined. In one embodiment, the complete file name of the caller is determined. Herein a complete file name includes the file path with the file name.

In one embodiment, the complete file name of the caller is obtained as earlier described with reference to method 208A and operation 302 (FIG. 3). Thus, once the PID is obtained, the module or process name of the caller is obtained using the PID. Detection application 106 obtains the complete file name of the caller from the module or process name, for example, "C:\mydownloads\happyworm.exe". Upon determination of the caller, DETERMINE CALLER operation 402 transitions processing to a DETERMINE DESTINATION operation 404.

In DETERMINE DESTINATION operation 404, the destination of the file being closed is determined. In one embodiment, the complete file name of destination 604 is determined from call 600. For example, in call 600, "C:\P2P\happy2003.exe", is the complete file name of destination 604. Upon determination of the destination, DETERMINE DESTINATION operation 404 transitions processing to a DESTINATION SHARED FILE FOLDER check operation 406.

In DESTINATION SHARED FILE FOLDER check operation 406, a determination is made whether the destination is in a shared file folder, such as a P2P shared file folder, for example, P2P shared file folder 126. In one embodiment, this determination is made by examining the complete file name of destination 604, e.g., "C:\P2P\happy2003.exe", for the presence of a shared file folder name, such as "P2P", "My P2P Folder", "My Shared Folder", or "Shared", among others. In one embodiment, the complete file name of destination 604, e.g., "C:\P2P\happy2003.exe", is scanned or parsed for file folder names matching shared file folder name entries in a shared file folder name list as earlier described with reference to DESTINATION SHARED FILE FOLDER check operation 308 of method 208A (FIG. 3).

When a file folder name of destination 604 matches a shared file folder name entry in the shared file folder name list, destination 604 is determined to be in a shared file folder. Otherwise, when a file folder name of destination 604 does not match a shared file folder name entry in the shared file folder name list, destination 604 is not determined to be in a shared file folder.

Upon a determination that the destination is not in a shared file folder ("NO"), the call is not determined to indicate malicious code and processing exits method 208B and transitions from DESTINATION SHARED FILE FOLDER check operation 406 to RELEASE CALL operation 210 of method 200.

Alternatively, a determination that the destination is in a shared file folder ("YES"), DESTINATION SHARED FILE FOLDER check operation 406 transitions processing to a CALLER/DESTINATION EQUIVALENT CONTENTS check operation 408.

In CALLER/DESTINATION EQUIVALENT CONTENTS check operation 408, a determination is made whether the contents or at least a portion of the contents of the caller is equivalent to the contents or at least a portion of the contents at destination 604. This determination evaluates whether a caller is replicating, for example by incremental reads and writes, at least a portion of its contents, such as a program code section of its contents, to a destination. More particularly, in one embodiment, this determination evaluates whether the caller, "C:\mydownloads\happyworm.exe", is replicating at least a portion of its program code section contents to destination 604.

While this action may occur as a result of non-malicious code (later discussed with regard to exclusions), it is viewed as an unusual occurrence. More typically, a caller would not replicate itself, or a program code section of itself, to a shared file folder, whereas some malicious code propagates in this way. For example, a P2P worm can prepend itself to an existing file, overwrite an existing file with itself, or replicate a portion of its file contents, such as by using read/write functions, making it more difficult to discern whether the computer worm file is replicating itself (or of a portion of itself, such as a malicious code section).

In the present embodiment, the contents or a portion of the contents of the caller and the contents or a portion of the contents at destination 604 are equivalent when a large enough amount of the contents or a portion of the contents of both match (according to a selected comparison technique). Thus, even if small changes are introduced into the contents at destination 604 in order to make it appear that the file being created is different from the caller, if a large enough amount of the contents or portion of the contents match the contents or a portion of the contents of the caller, the files are equivalent. A wide variety of comparison techniques can be utilized in determining whether the contents or a portion of the contents of the caller and the contents or a portion of the contents at destination 604 are equivalent.

For example, in one embodiment, the contents of the caller "C:\mydownloads\happyworm.exe", and the contents of destination 604, "C:\P2P\happy2003.exe", are accessed and examined to determine a program code section (or program code sections). The program code section of the caller, "C:\mydownloads\happyworm.exe", and the program code section of the contents at destination 604, "C:\P2P\happy2003.exe", are cryptographically hashed, for example, using a hashing algorithm, such as SHA-1 or MD5, among others. Hashing is well known to those of skill in the art and not further described herein for clarity.

The hashed program code sections are compared with each other to determine differences. When the hashed program code section of the contents at destination 604 differs from the hashed program code section of the caller by an amount less than or equal to ($\leq$) a threshold value, for example, 5% (five percent), the contents at destination 604 and the caller are determined to be equivalent, otherwise they are not determined to be equivalent.

In another example, the program code section of the caller and the program code section of the contents at destination 604 are not cryptographically hashed and are compared with each other byte by byte to determine differences. When the difference between the program code section of the caller and the program code section of the contents at destination 604 is not greater than (>) a threshold value, such as 1 byte, within a specified number of bytes, such as 512 bytes, the contents of the caller and destination 604 are determined to be equivalent, otherwise, they are not determined to be equivalent. It can be appreciated by those of skill in the art that, in other examples, converse algorithms and different threshold values can also be used.

Upon a determination that the contents (or at least a portion of the contents) of the caller and destination 604 are not equivalent ("NO"), the call is not determined to indicate malicious code and processing exits method 208B and transitions from CALLER/DESTINATION EQUIVALENT CONTENTS check operation 408 to RELEASE CALL operation 210 of method 200.

Alternatively, upon a determination that the contents (or at least a portion of the contents) of the caller and destination 604 are equivalent, the call is tentatively, and more strongly, indicative of malicious code, barring its exclusion. Thus, to provide a check to a possible false positive determination of a call as indicative of malicious code, CALLER/DESTINATION EQUIVALENT CONTENTS check operation 408 transitions processing to an EXCLUDED check operation 410.

In EXCLUDED check operation 410, a determination is made whether the caller is excluded from a determination of a malicious code detection as earlier described with reference to EXCLUDED check operation 312 of method 208A (FIG. 3). For example, in one embodiment, the complete file name or a portion of the complete file name of the caller, "C:\mydownloads\happyworm.exe", is compared to excluded caller entries in an exclusion list to determine whether there is a match.

Upon a determination that the caller matches an excluded caller entry on the exclusion list ("YES"), the caller is excluded from a determination of a malicious code detection. Thus, the call is defined as not indicative of malicious code, e.g., malicious code is not detected ("NO"), and processing exits method 208B and transitions from EXCLUDED check operation 410 to RELEASE CALL operation 210 of method 200.

Alternatively, upon a determination that the caller does not match an excluded caller entry on the exclusion list ("NO"), the caller is not excluded from a determination of a malicious code detection. Thus, the call is determined to be indicative of malicious code, e.g., malicious code is detected ("YES"), and processing exits method 208B and transitions from EXCLUDED check operation 410 to PROTECTIVE ACTION operation 212 of method 200.

Thus, in method 208B, a caller of a close file function which replicates it contents or a portion of its contents, such as a program code section, to a destination in a shared file folder, and is not excluded, is determined to indicate malicious code, e.g., malicious code is detected.

Figure 7:
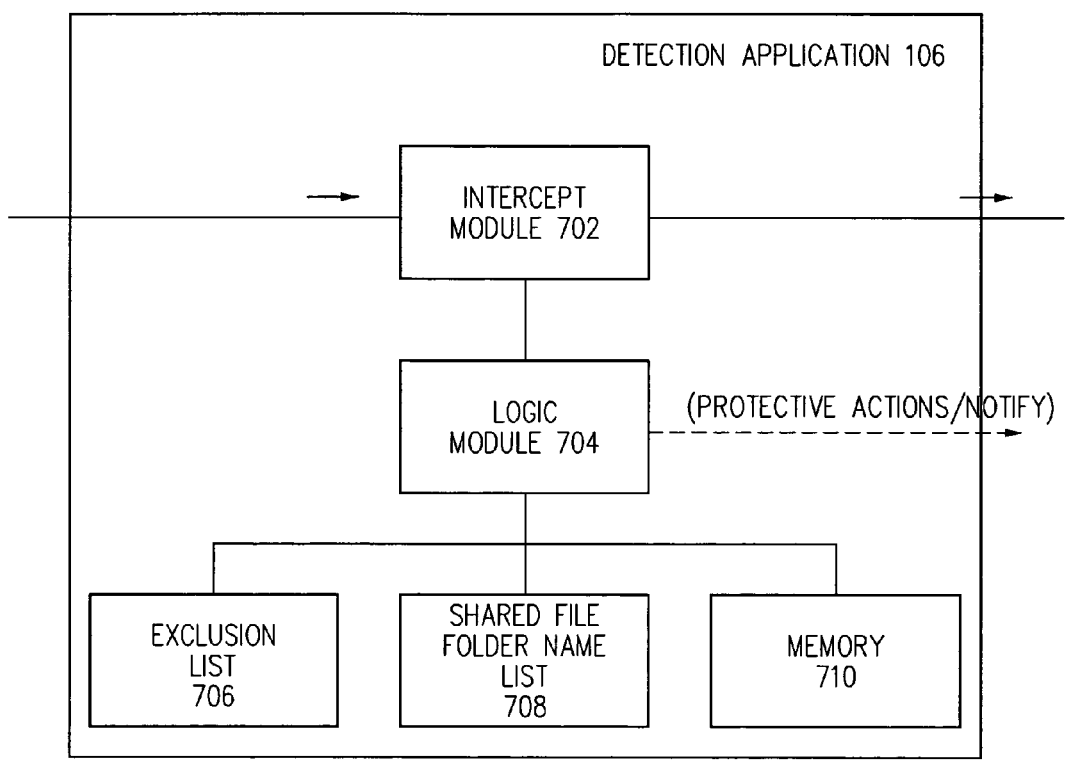
FIG. 7 illustrates a functional block diagram of the detection application of FIG. 1 in accordance with one embodiment of the invention.

FIG. 7 illustrates a functional block diagram of detection application 106 of FIG. 1 in accordance with one embodiment of the invention. In one embodiment, detection application 106 includes an intercept module 702, a logic module 704, an exclusion list 706, a shared file folder name list 708, and a memory 710. In some embodiments, exclusion list 706 and shared file folder name list 708 include default entries, however, in some embodiments, the default entries are user extendible. In some embodiments, logic module 704 includes logic for determining whether files are the same, as well as comparison technique logic and threshold values for use in determining whether files are equivalent. In some embodiments, the threshold values are configurable by a user.

In one embodiment, as earlier described with reference to methods 200, 208A, and 208B intercept module 702 intercepts a call to a file system function, such as a call to a file system function that copies or closes a file, in the context of a caller and stalls the call. Logic module 704 utilizing any, some or all of intercept module 702, exclusion list 706, shared file folder name list 708, and memory 710, determines whether malicious code is detected based on the call.

Upon a determination that malicious code is detected, logic module 704 initiates protective actions, and optionally generates a notification, such as a notification to a user that malicious code is detected and any protective action taken, such as terminating the call to the file system function. Alternatively, upon a determination that malicious code is not detected, logic module 704 initiates release of the stalled call, for example, from intercept module 702.

Referring again to FIG. 1, in one embodiment, detection application 106 is stored in computer memory 112. As used herein, a computer memory refers to a volatile memory, a non-volatile memory, or a combination of the two.

Although detection application 106 is referred to as an application, this is illustrative only. Detection application 106 should be capable of being called from an application or an operating system. In one embodiment, an application is generally defined to be any executable code. Moreover, those of skill in the art will understand that when it is said that an application or an operation takes some action, the action is the result of executing one or more instructions by a processor.

While embodiments in accordance with the invention have been described for a stand-alone computer system, a P2P networked computer system, or a client-server configuration, an embodiment of the invention may be carried out using any suitable hardware configuration involving a personal computer, a workstation, a portable device, or a network of computer devices. Other network configurations, e.g., peer-to-peer, web-based, intranet, internet network configurations, can be used in other embodiments.

Detection application 106 can further be embodied as a computer program product. Herein, a computer program product comprises a medium configured to store or transport computer-readable code, for any, some, all, or portions of methods 200, 208A, and 208B. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, detection application 106 may be stored in memory 136 that is physically located in a location different from processor 108. Processor 108 should be coupled to memory 136. This could be accomplished in a client-server system, or alternatively via a connection to another computer via modems and analog lines, or digital interfaces and a digital carrier line, including optical interfaces and optical carriers.

More specifically, in one embodiment, host computer system 102A and/or server computer system 130 is a portable computer, a workstation, a two-way pager, a cellular telephone, a digital wireless telephone, a personal digital assistant, a server computer, an Internet appliance, or any other device that includes components that can execute the detection functionality in accordance with at least one of the embodiments as described herein. Similarly, in another embodiment, host computer system 102A and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

Further herein, a means for performing a particular function is accomplished using the appropriate computer-readable code and the related hardware necessary to performing the function.

In view of this disclosure, the malicious code detection functionality in accordance with the various embodiments of the invention described herein can be implemented in a wide variety of computer system configurations. In addition, the malicious code detection functionality can be stored as different modules in memories of different devices. For example, detection application 106 can initially be stored in server computer system 130, and then as necessary, a portion of detection application 106 can be transferred to host computer system 102A and executed on host computer system 102A. Consequently, part of the malicious code detection functionality would be executed on processor 132 of server computer system 130, and another part would be executed on processor 108 of host computer system 102A. In view of this disclosure, those of skill in the art can implement various embodiments of the invention in a wide variety of physical hardware configurations using an operating system and computer programming language of interest to the user.

In yet another embodiment, detection application 106 is stored in memory 136 of server computer system 130. Detection application 106 is transferred over network 124 to memory 112 in host computer system 102A. In this embodiment, network interface 138 and I/O interface 110 would include analog modems, digital modems (including optical modems), or a network interface card. If modems are used, network 124 includes a communications network, and detection application 106 is downloaded via the communications network.

This disclosure provides exemplary embodiments of the invention. The scope of the invention is not limited by these exemplary embodiments. In particular, the operations described with reference to methods 208A and 208B are not limited to the order illustrated and described herein and other orders of the operations are possible. For example the determination of whether a caller is excluded, e.g., operations 312 and 410, can, in other embodiments, be performed prior to earlier operations, e.g., operations 308 and 406, respectively, or operations 304 and 404, respectively.

Further, there are a wide variety of comparison techniques (and threshold values) that can be used to determine whether contents of a caller and contents at a destination are equivalent, and the examples presented herein are not intended to limit the selection of comparison techniques that can be used. Thus, numerous variations, whether explicitly provided for by the specification or implied by the specification or not, may be implemented by one of skill in the art in view of this disclosure.

What is claimed is:

1. A method comprising:
intercepting a call to a file system function in a context of a caller, wherein said file system function copies a file at a source to a destination;
stalling said call;
determining whether malicious code is detected based upon said call, wherein said determining whether malicious code is detected based upon said call comprises:
determining said caller;
determining said source;
determining said destination;
determining whether said destination is in a shared file folder;
determining whether said caller and said source are the same;
determining whether said caller is excluded; and
wherein upon a determination that said caller is not excluded, that said destination is in said shared file folder, and that said caller and said source are the same, determining said malicious code is detected; and
upon a determination that said malicious code is detected, implementing protective actions.

2. The method of claim 1, further comprising:
generating a notification.

3. The method of claim 1, further comprising:
terminating said call.

4. The method of claim 1, wherein upon a determination that said malicious code is not detected, said method further comprising:
releasing said call to said file system function.

5. The method of claim 1, wherein upon a determination that said destination is not in said shared file folder, said method further comprises:
determining said malicious code is not detected; and
releasing said call to said file system function.

6. The method of claim 1, wherein upon a determination that said caller and said source are not the same, said method further comprises:
determining said malicious code is not detected; and
releasing said call to said file system function.

7. The method of claim 1, wherein upon a determination that said caller is excluded, said method further comprises:
determining said malicious code is not detected; and
releasing said call to said file system function.

8. The method of claim 1, wherein said file system function closes a file at a destination.

9. The method of claim 8, wherein said determining whether malicious code is detected based upon said call comprises:
determining said caller;
determining said destination;
determining whether said destination is in a shared file folder;
determining whether at least a portion of a contents of said caller and at least a portion of a contents at said destination are equivalent;
determining whether said caller is excluded; and
wherein upon a determination that said caller is not excluded, that said destination is in said shared file folder, and that said at least a portion of said contents of said caller and a said least a portion of said contents at said destination are equivalent, determining said malicious code is detected.

10. The method of claim 9, wherein upon a determination that said destination is not in said shared file folder, said method further comprises:
determining said malicious code is not detected; and
releasing said call to said file system function.

11. The method of claim 9, wherein upon a determination that said at least a portion of said contents of said caller and said at least a portion of said contents at said destination are not equivalent, said method further comprises:
  determining said malicious code is not detected; and
  releasing said call to said file system function.

12. The method of claim 9, wherein upon a determination that said caller is excluded, said method further comprises:
  determining said malicious code is not detected; and
  releasing said call to said file system function.

13. A method comprising:
  intercepting a call to a file system function, which copies a file from a source to a destination, in a context of a caller;
  stalling said call;
  determining whether malicious code is detected based upon said call, comprising:
    determining said caller;
    determining said source;
    determining said destination;
    determining whether said caller is excluded,
    determining whether said destination is in a shared file folder, and
    determining whether said caller and said source are the same;
  upon a determination that said caller is not excluded, that said destination is in said shared file folder, and that said caller and said source are the same, determining said malicious code is detected; and
  upon a determination that said malicious code is detected, implementing protective actions.

14. The method of claim 13, further comprising:
  generating a notification.

15. The method of claim 13, further comprising:
  terminating said call.

16. The method of claim 13, wherein upon a determination that said caller is excluded, said method further comprises:
  determining said malicious code is not detected; and
  releasing said call to said file system function.

17. The method of claim 13, wherein upon a determination that said destination is not in said shared file folder, said method further comprises:
  determining said malicious code is not detected; and
  releasing said call to said file system function.

18. The method of claim 13, wherein upon a determination that said caller and said source are not the same, said method further comprises:
  determining said malicious code is not detected; and
  releasing said call to said file system function.

19. The method of claim 13, wherein said shared file folder is a file folder accessible by one or more computer systems on a peer-to-peer (P2P) network.

20. The method of claim 13, wherein said determining whether said caller and said source are the same comprises:
  determining a complete file name of said caller;
  determining a complete file name of said source;
  determining whether said complete file name of said caller and said complete file name of said source match; and
  upon a determination that said complete file name of said caller and said complete file name of said source match, determining that said caller and said source are the same.

21. A method comprising:
  intercepting a call to a file system function, which closes a file at a destination, in a context of a caller;
  stalling said call;
  determining whether malicious code is detected based upon said call, comprising:
    determining said caller,
    determining said destination,
    determining whether said caller is excluded,
    determining whether said destination is in a shared file folder, and
    determining whether at least a portion of a contents of said caller and at least a portion of a contents at said destination are equivalent;
  upon a determination that said caller is not excluded, that said destination is in said shared file folder, and that said at least a portion of said contents of said caller and said at least a portion of said contents at said destination are equivalent, determining said malicious code is detected; and
  upon a determination that said malicious code is detected, implementing protective actions.

22. The method of claim 21, further comprising:
  generating a notification.

23. The method of claim 21, further comprising:
  terminating said call.

24. The method of claim 21, wherein upon a determination that said caller is excluded, said method further comprises:
  determining said malicious code is not detected; and
  releasing said call to said file system function.

25. The method of claim 21, wherein upon a determination that said destination is not in said shared file folder, said method further comprises:
  determining said malicious code is not detected; and
  releasing said call to said file system function.

26. The method of claim 21, wherein upon a determination that said at least a portion of said contents of said caller and said at least a portion of said contents at said destination are not equivalent, said method further comprises:
  determining said malicious code is not detected; and
  releasing said call to said file system function.

27. The method of claim 21, wherein said shared file folder is a file folder accessible by one or more computer systems on a peer-to-peer (P2P) network.

28. The method of claim 21, wherein said determining whether at least a portion of a contents of said caller and at least a portion of a contents at said destination are equivalent further comprises:
  comparing said at least a portion of said contents of said caller and said at least a portion of said contents at said destination to determine whether said at least a portion of said contents of said caller and said at least a portion of said contents at said destination differ by an amount less than a threshold value utilized by a specified comparison technique;
  wherein upon a determination that said at least a portion of said contents of said caller and said at least a portion of said contents at said destination differ by an amount less than said threshold value, determining said at least a portion of said contents of said caller and said at least a portion of said contents at said destination are equivalent; and
  wherein upon a determination that said at least a portion of said contents of said caller and said at least a portion of said contents at said destination do not differ by an amount less than said threshold value, determining said at least a portion of said contents of said caller and said at least a portion of said contents at said destination are not equivalent.

29. A computer system comprising:
a means for intercepting a call to a file system function in a context of a caller, wherein said file system function copies a file at a source to a destination;
a means for stalling said call;
a means for determining whether malicious code is detected based upon said call, wherein said means for determining whether malicious code is detected based upon said call comprises:
means for determining said caller;
means for determining said source;
means for determining said destination;
means for determining whether said destination is in a shared file folder;
means for determining whether said caller and said source are the same;
means for determining whether said caller is excluded; and
wherein upon a determination that said caller is not excluded, that said destination is in said shared file folder, and that said caller and said source are the same, means for determining said malicious code is detected;
a means for implementing protective actions upon a determination that malicious code is detected; and
a means for releasing said call to said file system function upon a determination that malicious code is not detected.

30. A computer program product comprising a computer-readable medium containing computer program code for a method comprising:
intercepting a call to a file system function in a context of a caller, wherein said file system function copies a file at a source to a destination;
stalling said call;
determining whether malicious code is detected based upon said call, wherein said determining whether malicious code is detected based upon said call comprises:
determining said caller;
determining said source;
determining said destination;
determining whether said destination is in a shared file folder;
determining whether said caller and said source are the same;
determining whether said caller is excluded; and
wherein upon a determination that said caller is not excluded, that said destination is in said shared file folder, and that said caller and said source are the same, determining said malicious code is detected; and
upon a determination that malicious code is detected, implementing protective actions.

* * * * *